(12) United States Patent
Logan

(10) Patent No.: US 11,172,776 B1
(45) Date of Patent: Nov. 16, 2021

(54) PACKAGE LOCKBOX APPARATUS

(71) Applicant: Latarha Logan, Lithonia, GA (US)

(72) Inventor: Latarha Logan, Lithonia, GA (US)

( * ) Notice: Subject to any disclaimer, the term of this patent is extended or adjusted under 35 U.S.C. 154(b) by 0 days.

(21) Appl. No.: 17/123,800

(22) Filed: Dec. 16, 2020

(51) Int. Cl.
*A47G 29/14* (2006.01)
*G08B 21/18* (2006.01)
*G08B 5/36* (2006.01)
*H02S 40/38* (2014.01)

(52) U.S. Cl.
CPC ............ *A47G 29/141* (2013.01); *G08B 5/36* (2013.01); *G08B 21/18* (2013.01); *H02S 40/38* (2014.12)

(58) Field of Classification Search
CPC .. A47G 29/141; A47G 29/142; A47G 29/143; A47G 29/144; A47G 29/145; A47G 29/146; A47G 29/147; A47G 29/148; A47G 29/149; G08B 5/36; G08B 21/18; H02S 40/38
See application file for complete search history.

(56) References Cited

U.S. PATENT DOCUMENTS

| | | |
|---|---|---|
| 5,979,750 A | 11/1999 | Kindell |
| 6,612,489 B2 | 9/2003 | McCormick |
| D528,164 S | 9/2006 | Orcutt |
| 9,861,221 B2 | 1/2018 | Jiang |
| 2014/0008246 A1 | 1/2014 | Pfeiffer |
| 2015/0102903 A1 | 4/2015 | Wilkinson |
| 2017/0251856 A1 | 9/2017 | Schaible |
| 2020/0237946 A1* | 7/2020 | Shell .................... A61L 2/22 |
| 2020/0359820 A1* | 11/2020 | Raphael ............... A47G 29/141 |
| 2020/0367685 A1* | 11/2020 | Chambers .......... G07C 9/00896 |
| 2021/0022536 A1* | 1/2021 | Anderson ............. B64C 39/024 |
| 2021/0127881 A1* | 5/2021 | Estill ................. G07C 9/00309 |

\* cited by examiner

*Primary Examiner* — Orlando Bousono

(57) ABSTRACT

A package lockbox apparatus for safely receiving packages includes a box body and a lid hingingly coupled to the box body. A housing is coupled to a lid bottom side of the lid. A microprocessor is coupled within the housing. A battery, a display, a camera, and a lock are coupled to the lid and are in operational communication with the microprocessor. A catch is coupled to the box body. The catch is coupled to the box front side adjacent the box top side and within the box inside. The catch is selectively engageable with the lock.

13 Claims, 6 Drawing Sheets

PACKAGE LOCKBOX APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lockbox devices and more particularly pertains to a new lockbox device for safely receiving packages.

(2) Description of Related Art Including Information Disclosed Under 37 CFR 1.97 and 1.98

The prior art relates to lockbox devices. Existing devices have locks and alarms but lack a means of tracking the box if the entire device is stolen. These devices also lack a base layer filled with a dense material to intentionally increase weight and prevent removal. Known devices also typically do not include an integrated monitoring and communication system.

BRIEF SUMMARY OF THE INVENTION

An embodiment of the disclosure meets the needs presented above by generally comprising a box body having a box front side, a box back side, a box left side, a box right side, a box bottom side, and an open box top side defining a box inside. A lid is coupled to the box body. The lid has a lid front side, a lid back side, a lid left side, a lid right side, a lid bottom side, and a lid top side. The lid back side is hingingly coupled to the box back side adjacent the box top side. A housing is coupled to the lid. The housing coupled to the lid bottom side. A microprocessor is coupled within the housing. A battery is coupled to the lid. The battery is coupled to the lid bottom side and is in operational communication with the microprocessor. A display is coupled to the lid. The display is coupled to the lid top side and is in operational communication with the microprocessor. A camera is coupled to the lid. The camera is coupled to the display and is in operational communication with the microprocessor. A lock is coupled to the lid. The lock is coupled to the lid bottom side adjacent the lid front side and is in operational communication with the microprocessor. A catch is coupled to the box body. The catch is coupled to the box front side adjacent the box top side and within the box inside. The catch is selectively engageable with the lock.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
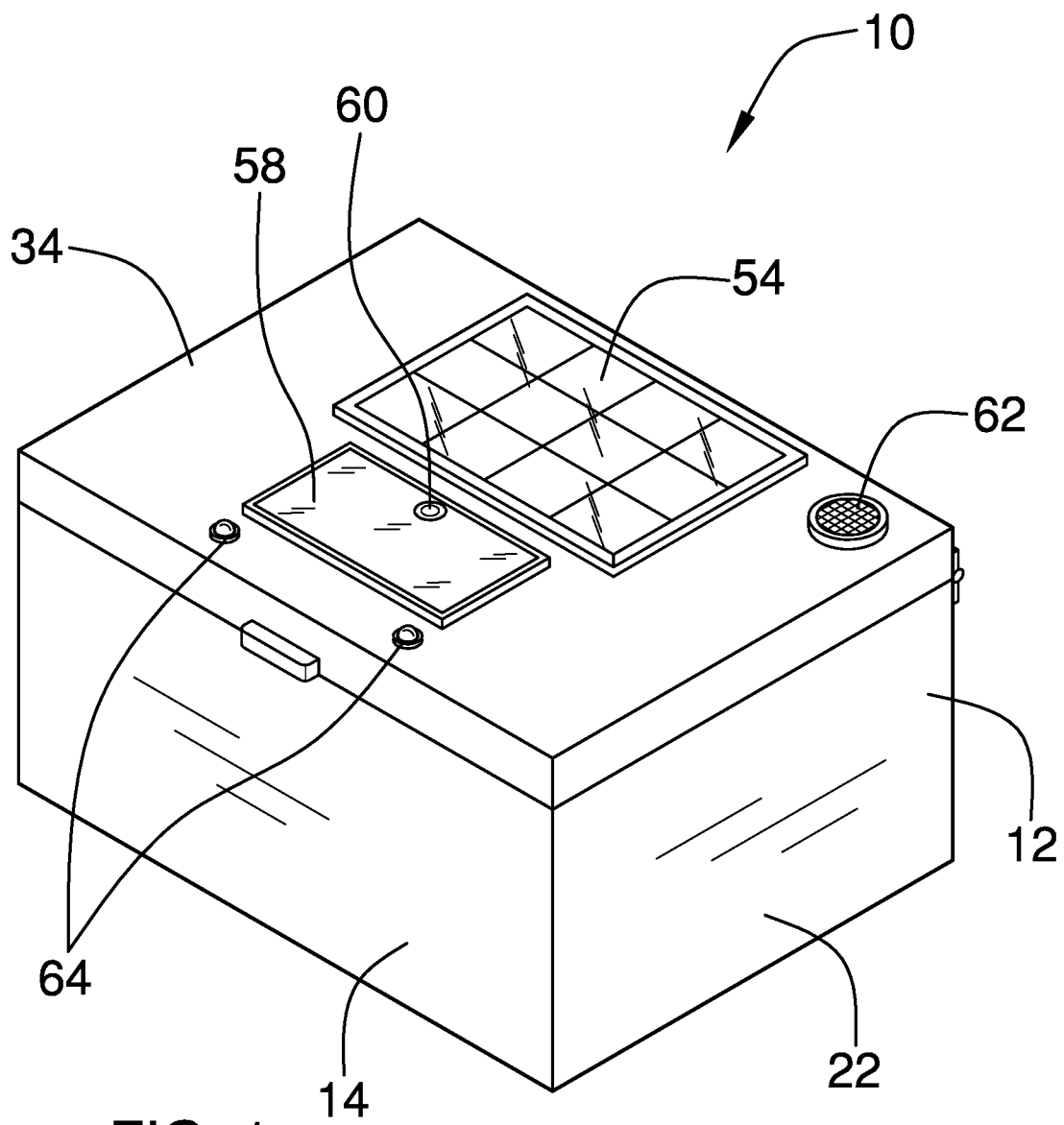
FIG. 1 is an isometric view of a package lockbox apparatus according to an embodiment of the disclosure.
Figure 2:
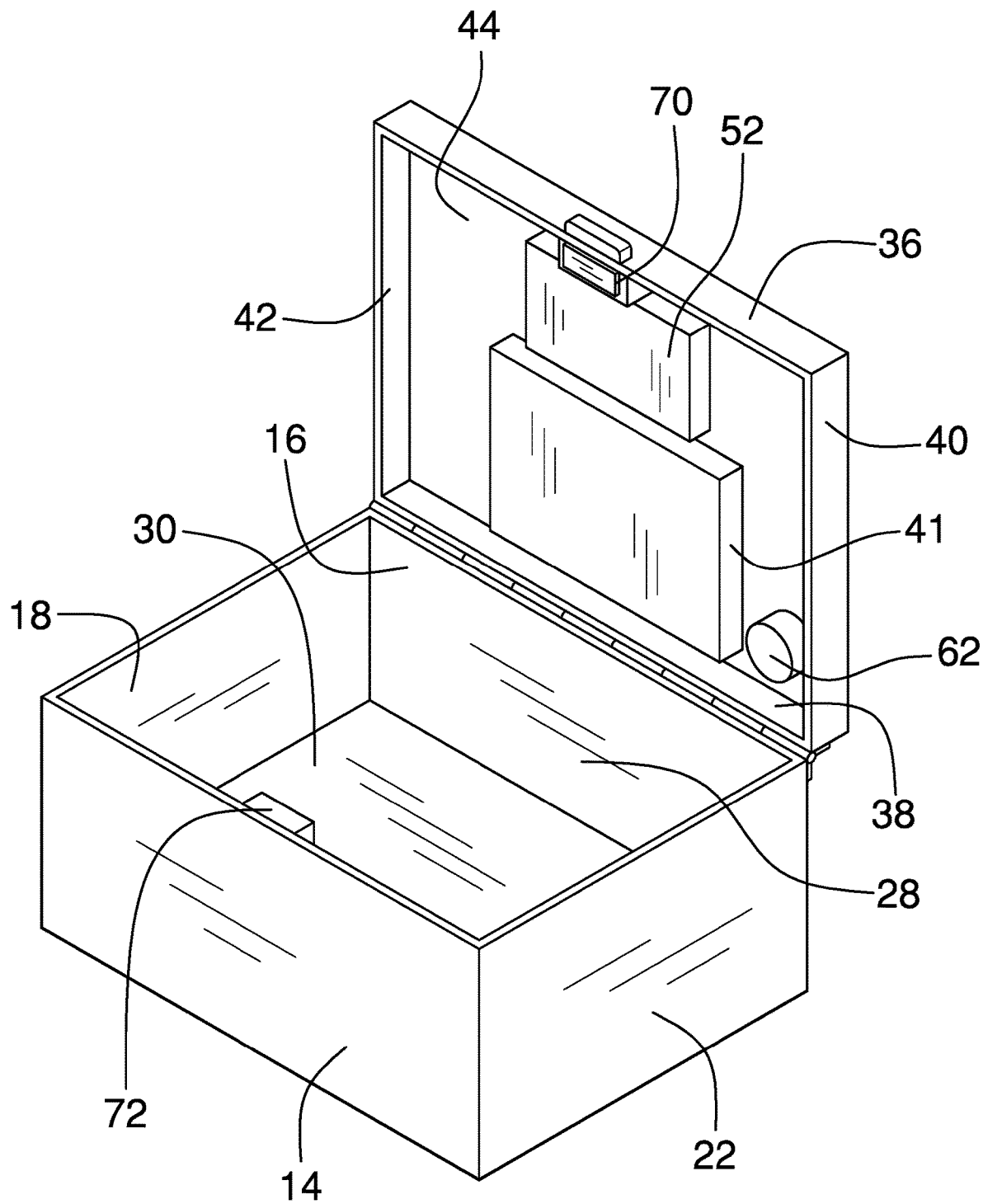
FIG. 2 is an isometric view of an embodiment of the disclosure.
Figure 3:
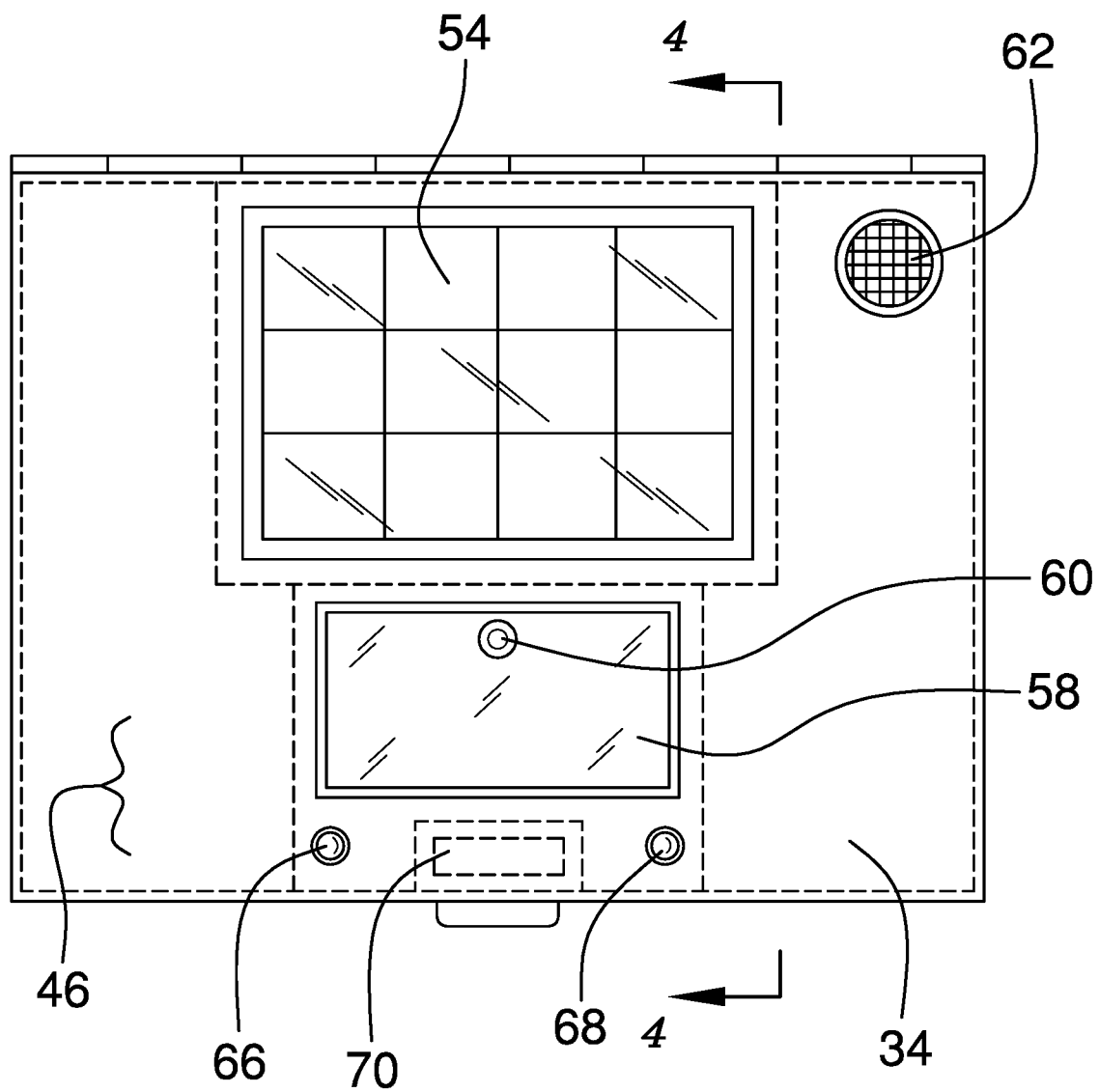
FIG. 3 is a top plan view of an embodiment of the disclosure.
Figure 4:
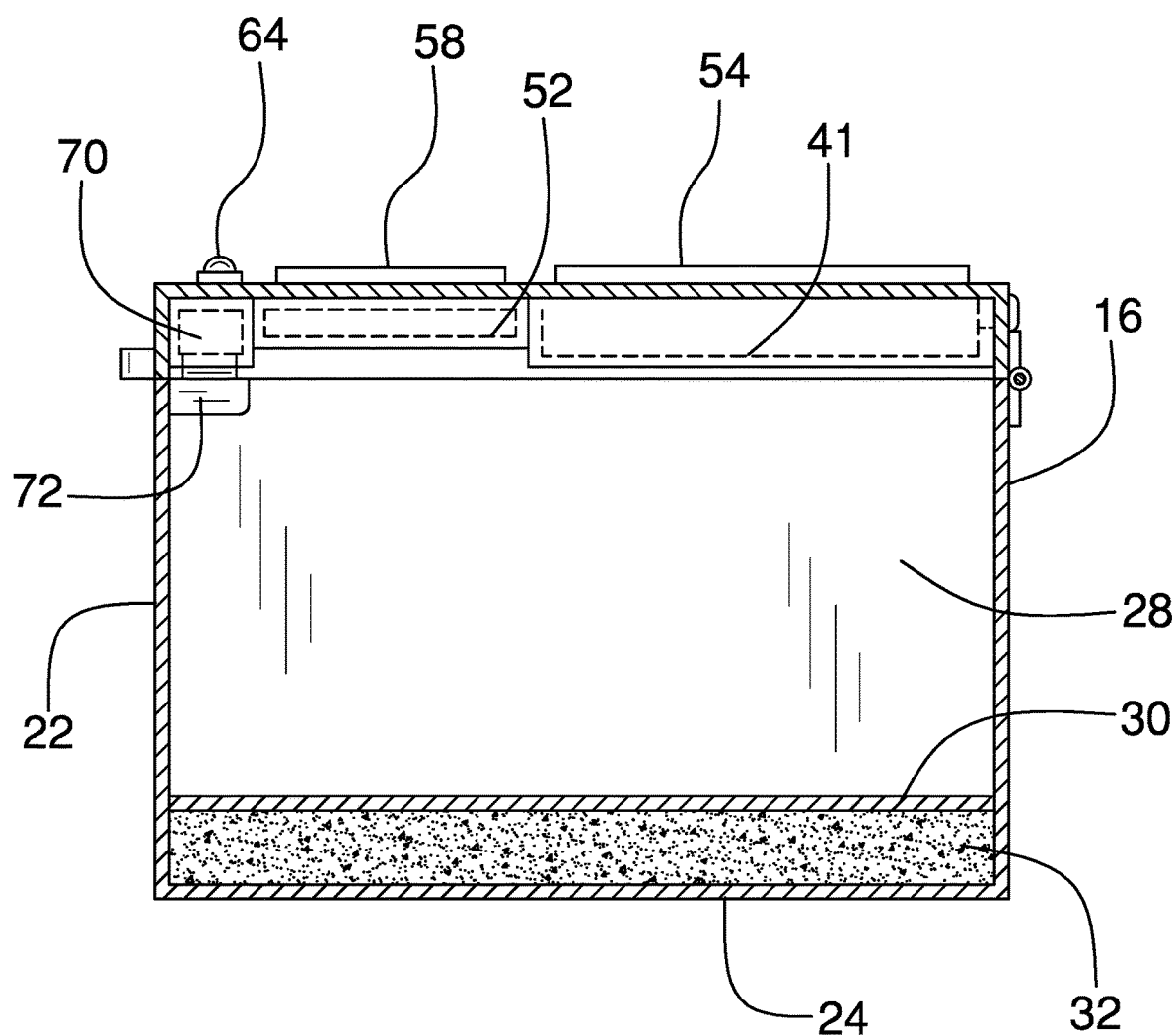
FIG. 4 is a cross-sectional view of an embodiment of the disclosure along the line 4-4 of FIG. 3.
Figure 5:
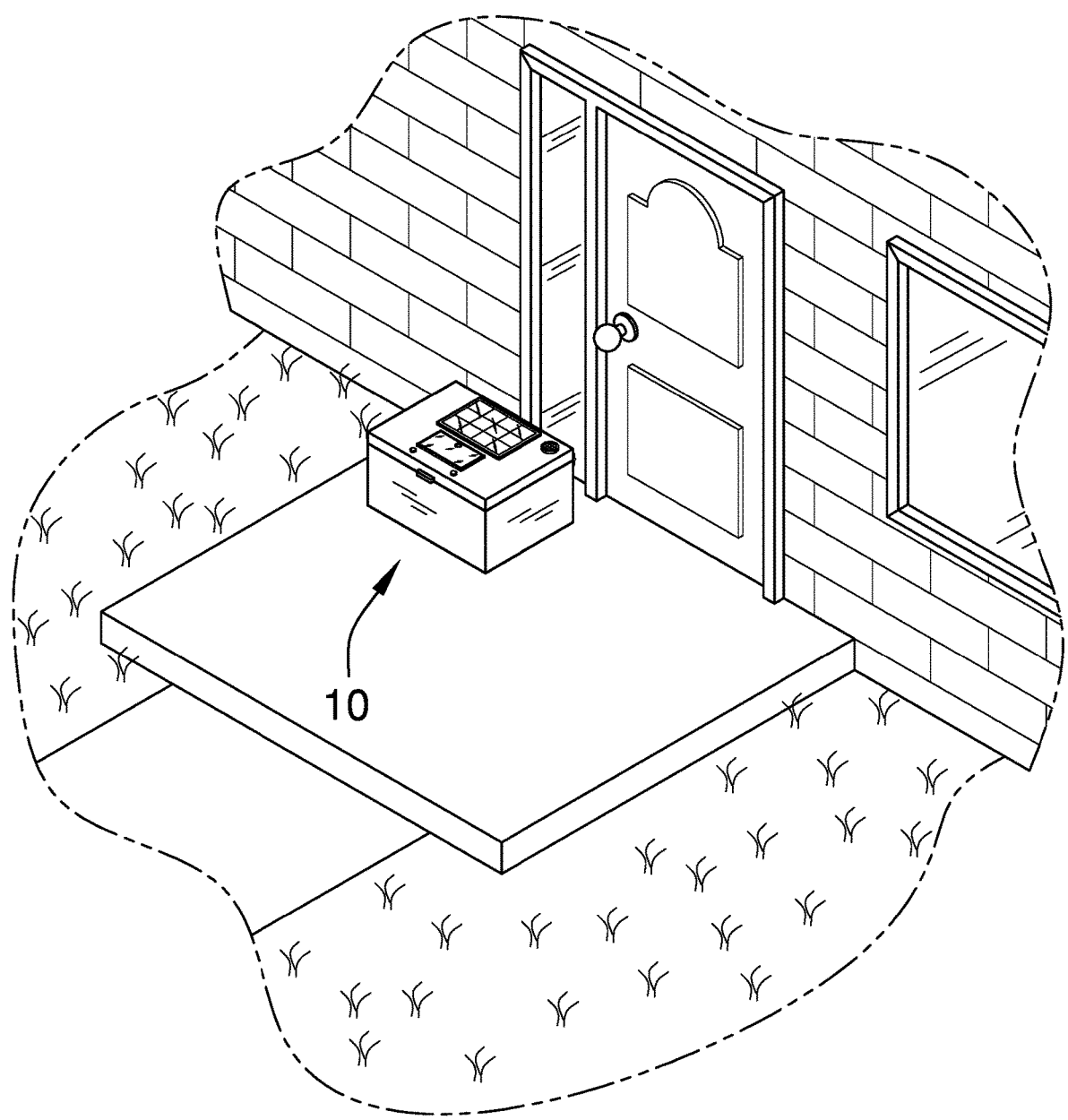
FIG. 5 is an in-use view of an embodiment of the disclosure.
Figure 6:
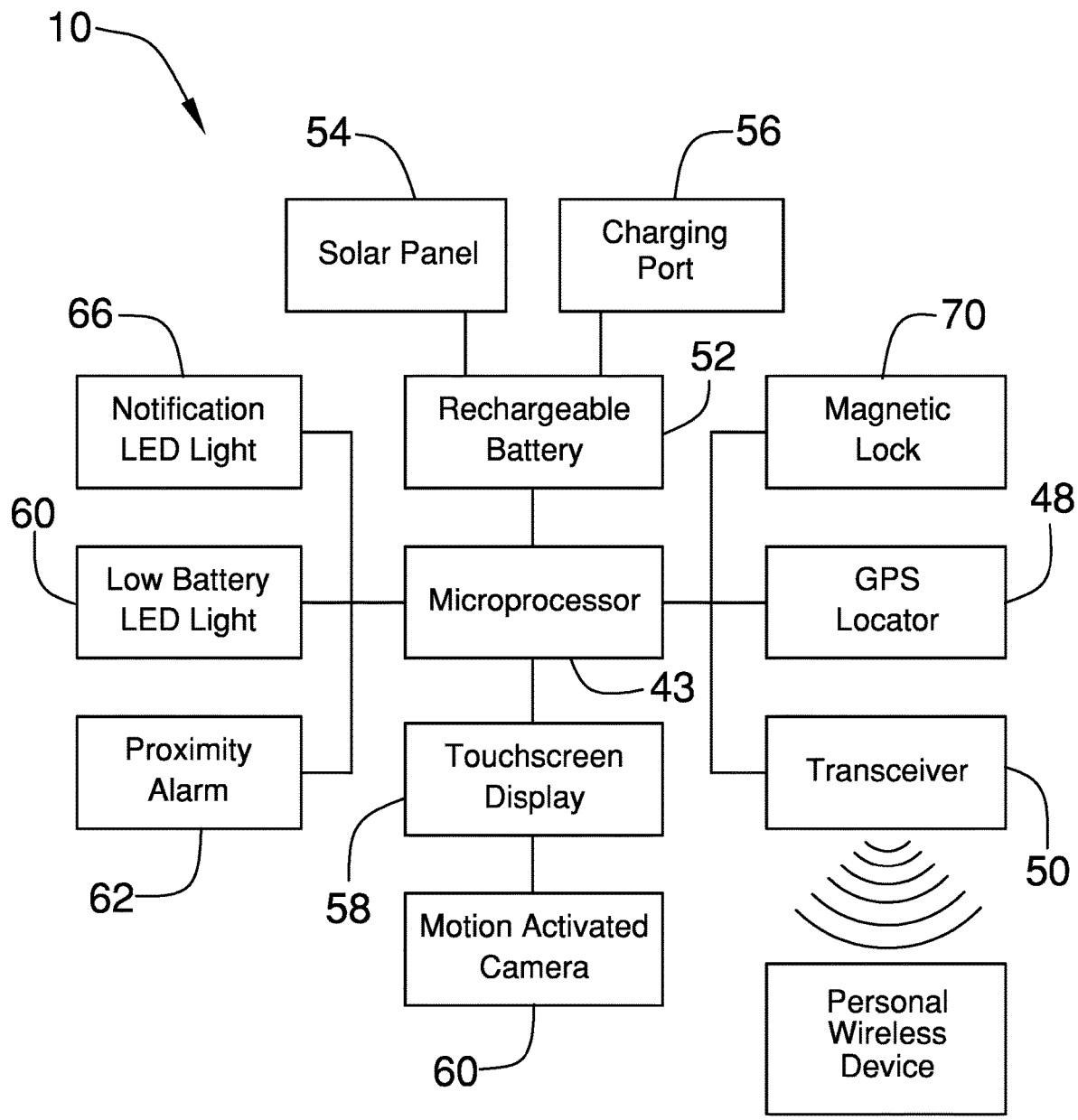
FIG. 6 is a block diagram view of an embodiment of the disclosure.

With reference now to the drawings, and in particular to FIGS. 1 through 6 thereof, a new lockbox device embodying the principles and concepts of an embodiment of the disclosure and generally designated by the reference numeral 10 will be described.

As best illustrated in FIGS. 1 through 6, the package lockbox apparatus 10 generally comprises a box body 12 having a box front side 14, a box back side 16, a box left side 18, a box right side 22, a box bottom side 24, and an open box top side 26 defining a box inside 28. A box floor 30 is coupled to the box body 12 and extends from the box front side 14 to the box back side 16 and from the box left side 18 to the box right side 22. The box floor 30 is spaced from the box bottom side 24 in parallel opposition and defines a base layer 32 therebetween. The base layer 32 is filled with a solid high-density material such as, but not limited to, cement, metal, sand, and the like in order to increase the weight of the apparatus 10 to prevent removal.

A lid 34 is coupled to the box body 12. The lid 34 has a lid front side 36, a lid back side 38, a lid left side 40, a lid right side 42, a lid bottom side 44, and a lid top side 46. The lid bottom side 44 may be recessed to allow things coupled thereto to not extend into the box inside 28. The lid back side 38 is hingingly coupled to the box back side 16 adjacent the box top side 26.

A housing 41 is coupled to the lid 34. The housing 41 is coupled to the lid bottom side 44. A microprocessor 43 is coupled within the housing 41. A GPS locator 48 and a transceiver 50 are coupled within the housing 41 and are in operational communication with the microprocessor 43. The GPS locator 48 allows the apparatus to be tracked if stolen while the transceiver 50 allows for interaction with the apparatus using a personal electronic device.

A battery 52 is coupled to the lid 34. The battery 52 is coupled to the lid bottom side 44 and is in operational communication with the microprocessor 43. A solar panel 54 may be coupled to the lid top side 46 and is in operational communication with the battery 52 to maintain charge. A charging port 56 is coupled to the lid 34. The charging port 56 may be coupled to the lid back side 38 and is in operational communication with the battery 52 to charge the battery 52 using a fixed power source.

A display 58 is coupled to the lid 34. The display 58 may be coupled to the lid top side 46 and is in operational communication with the microprocessor 43. The display 58 may be touchscreen to allow for user inputs. A camera 60 is coupled to the lid 34. The camera 60 is coupled to the display 58 and is in operational communication with the microprocessor 43. The camera 60 may have a motion sensor. A proximity alarm 62 may be coupled to the lid 34. The proximity alarm 62 is coupled to the lid top side 46 and is in operational communication with the microprocessor 43. A plurality of status lights 64 is coupled to the lid top side 46 and is in operational communication with the microprocessor 43. The plurality of status lights 64 may include a notification LED light 66 and a low battery LED light 68.

A lock 70 is coupled to the lid 34. The lock 70 is coupled to the lid bottom side 44 adjacent the lid front side 36. The lock 70 is in operational communication with the microprocessor 43 and may be electromagnetic. A catch 72 is coupled to the box body 12. The catch 72 is coupled to the box front side 14 adjacent the box top side 26 and within the box inside 28. The catch 72 may be ferrous and selectively engageable with the lock 70.

In use, a delivery man activates the camera 60 and the transceiver 50 when he or she approaches the apparatus. The delivery person may utilize the display 58 or the owner may disengage the lock 70 remotely to allow delivery into the box inside 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A package lockbox apparatus comprising:
   a box body having a box front side, a box back side, a box left side, a box right side, a box bottom side, and an open box top side defining a box inside;
   a lid coupled to the box body, the lid having a lid front side, a lid back side, a lid left side, a lid right side, a lid bottom side, and a lid top side, the lid back side being hingingly coupled to the box back side adjacent the box top side;
   a housing coupled to the lid, the housing being coupled to the lid bottom side;
   a microprocessor coupled within the housing;
   a battery coupled to the lid, the battery being coupled to the lid bottom side and being in operational communication with the microprocessor;
   a display coupled to the lid, the display being coupled to the lid top side and being in operational communication with the microprocessor;
   a camera coupled to the lid, the camera being coupled to the display and being in operational communication with the microprocessor;
   a lock coupled to the lid, the lock being coupled to the lid bottom side adjacent the lid front side, the lock being in operational communication with the microprocessor; and
   a catch coupled to the box body, the catch being coupled to the box front side adjacent the box top side and within the box inside, the catch being selectively engageable with the lock.

2. The package lockbox apparatus of claim 1 further comprising a box floor coupled to the box body, the box floor extending from the box front side to the box back side and from the box left side to the box right side, the box floor being spaced from the box bottom side in parallel opposition and defining a base layer therebetween.

3. The package lockbox apparatus of claim 2 further comprising the base layer being filled with a solid high-density material.

4. The package lockbox apparatus of claim 1 further comprising a GPS locator coupled within the housing, the GPS locator being in operational communication with the microprocessor.

5. The package lockbox apparatus of claim 1 further comprising the lid bottom side being recessed.

6. The package lockbox apparatus of claim 1 further comprising the lock being electromagnetic and the catch being ferrous.

7. The package lockbox apparatus of claim 1 further comprising a plurality of status lights coupled to the lid, the plurality of status lights being coupled to the lid top side and being in operational communication with the microprocessor.

8. The package lockbox apparatus of claim 1 further comprising the camera having a motion sensor.

9. The package lockbox apparatus of claim 8 further comprising a proximity alarm coupled to the lid, the proximity alarm being coupled to the lid top side and being in operational communication with the microprocessor.

10. The package lockbox apparatus of claim 1 further comprising a solar panel coupled to the lid, the solar panel being coupled to the lid top side and being in operational communication with the battery.

11. The package lockbox apparatus of claim 1 further comprising a charging port coupled to the lid, the charging port being coupled to the lid back side and being in operational communication with the battery.

12. The package lockbox apparatus of claim 1 further comprising a transceiver coupled within the housing, the transceiver being in operational communication with the microprocessor.

13. A package lockbox apparatus comprising:

a box body having a box front side, a box back side, a box left side, a box right side, a box bottom side, and an open box top side defining a box inside;

a box floor coupled to the box body, the box floor extending from the box front side to the box back side and from the box left side to the box right side, the box floor being spaced from the box bottom side in parallel opposition and defining a base layer therebetween, the base layer being filled with a solid high-density material;

a lid coupled to the box body, the lid having a lid front side, a lid back side, a lid left side, a lid right side, a lid bottom side, and a lid top side, the lid bottom side being recessed, the lid back side being hingingly coupled to the box back side adjacent the box top side;

a housing coupled to the lid, the housing being coupled to the lid bottom side;

a microprocessor coupled within the housing;

a GPS locator coupled within the housing, the GPS locator being in operational communication with the microprocessor;

a transceiver coupled within the housing, the transceiver being in operational communication with the microprocessor;

a battery coupled to the lid, the battery being coupled to the lid bottom side and being in operational communication with the microprocessor;

a solar panel coupled to the lid, the solar panel being coupled to the lid top side and being in operational communication with the battery;

a charging port coupled to the lid, the charging port being coupled to the lid back side and being in operational communication with the battery;

a display coupled to the lid, the display being coupled to the lid top side and being in operational communication with the microprocessor;

a camera coupled to the lid, the camera being coupled to the display and being in operational communication with the microprocessor, the camera having a motion sensor;

a proximity alarm coupled to the lid, the proximity alarm being coupled to the lid top side and being in operational communication with the microprocessor;

a plurality of status lights coupled to the lid, the plurality of status lights being coupled to the lid top side and being in operational communication with the microprocessor;

a lock coupled to the lid, the lock being coupled to the lid bottom side adjacent the lid front side, the lock being in operational communication with the microprocessor, the lock being electromagnetic; and a catch coupled to the box body, the catch being coupled to the box front side adjacent the box top side and within the box inside, the catch being ferrous and selectively engageable with the lock.

* * * * *